Dec. 31, 1968 H. C. EMERSON 3,418,707
INTEGRATED AND MATCH MACHINED ROCKET NOZZLE
AND PROCESS OF MAKING SAME
Filed April 19, 1965 Sheet 1 of 6
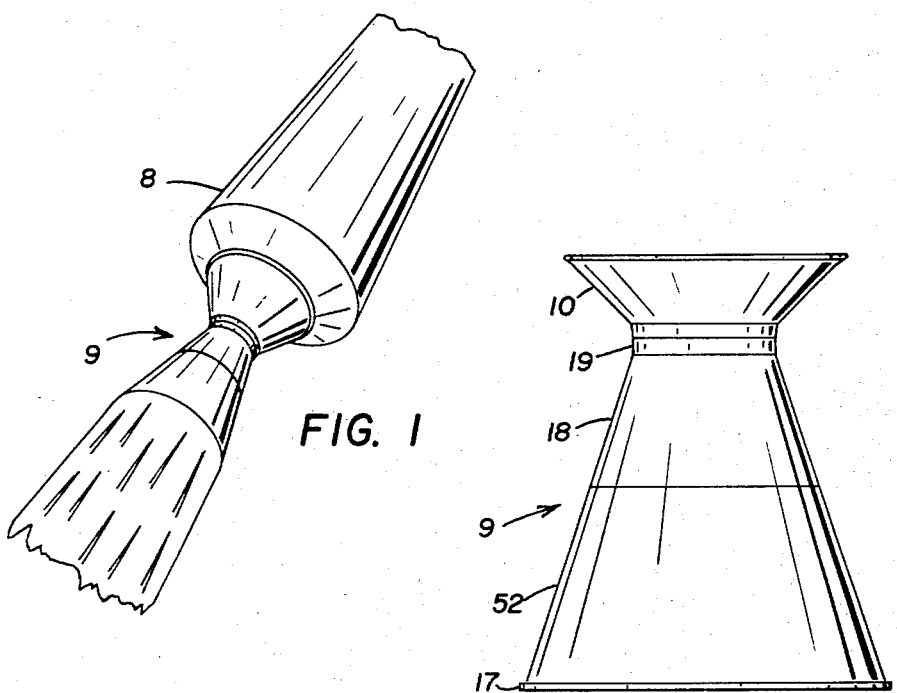
FIG. 1
FIG. 2
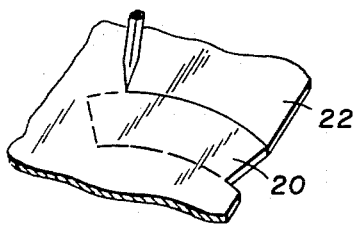
FIG. 4
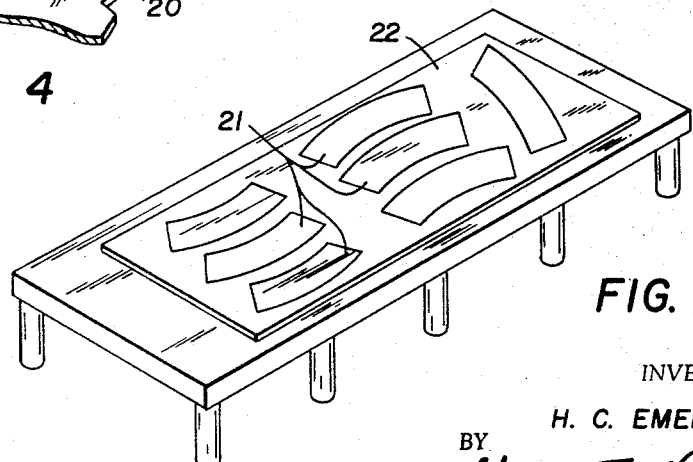
FIG. 3
INVENTOR.
H. C. EMERSON
BY George E. Pearson
ATTORNEY Dec. 31, 1968  H. C. EMERSON  3,418,707
INTEGRATED AND MATCH MACHINED ROCKET NOZZLE
AND PROCESS OF MAKING SAME
Filed April 19, 1965  Sheet 3 of 6

INVENTOR.
H. C. EMERSON
BY
George E. Pearson
ATTORNEY

Dec. 31, 1968 H. C. EMERSON 3,418,707
INTEGRATED AND MATCH MACHINED ROCKET NOZZLE
AND PROCESS OF MAKING SAME
Filed April 19, 1965 Sheet 4 of 6
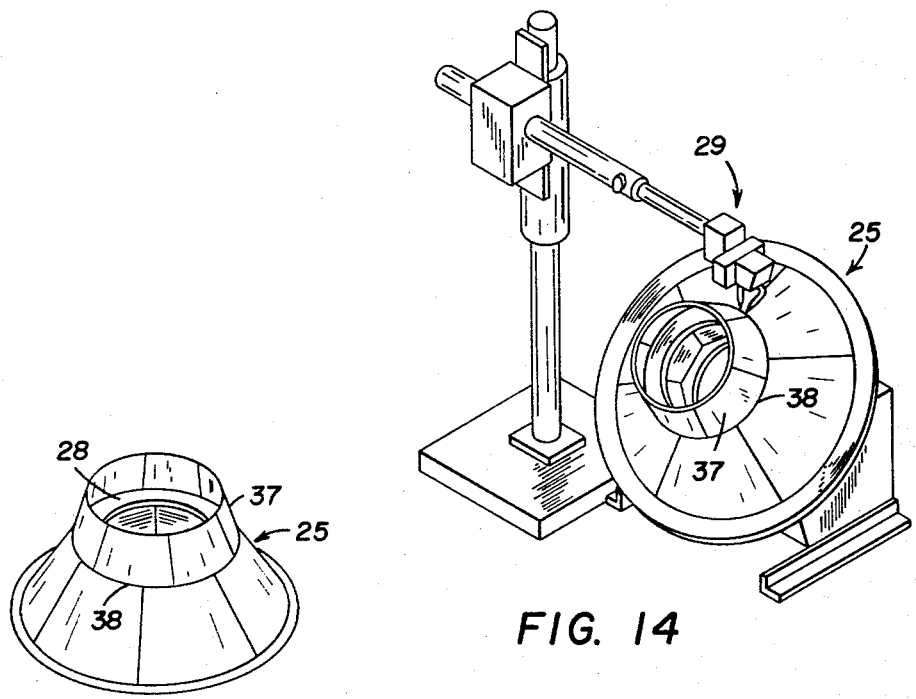
FIG. 14
FIG. 13
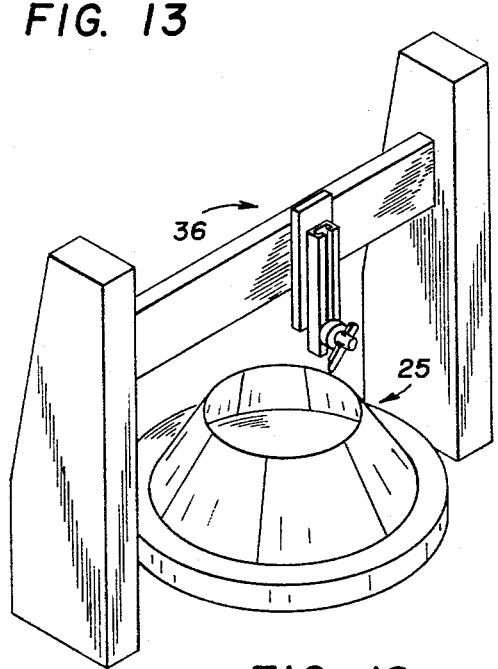
FIG. 12
INVENTOR.
H. C. EMERSON
BY
*George E. Pearson*
ATTORNEY

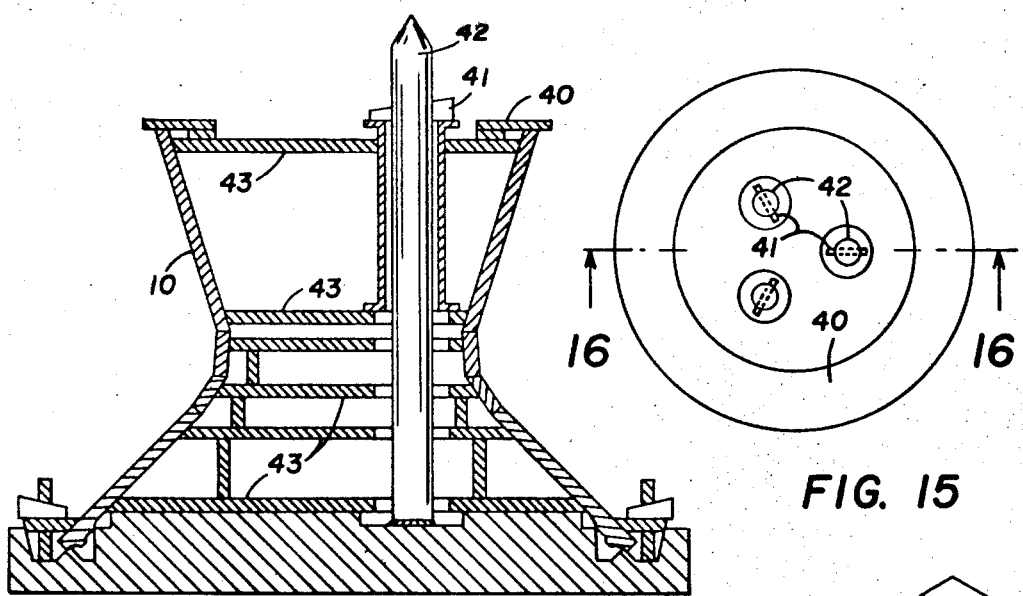
FIG. 16
FIG. 15
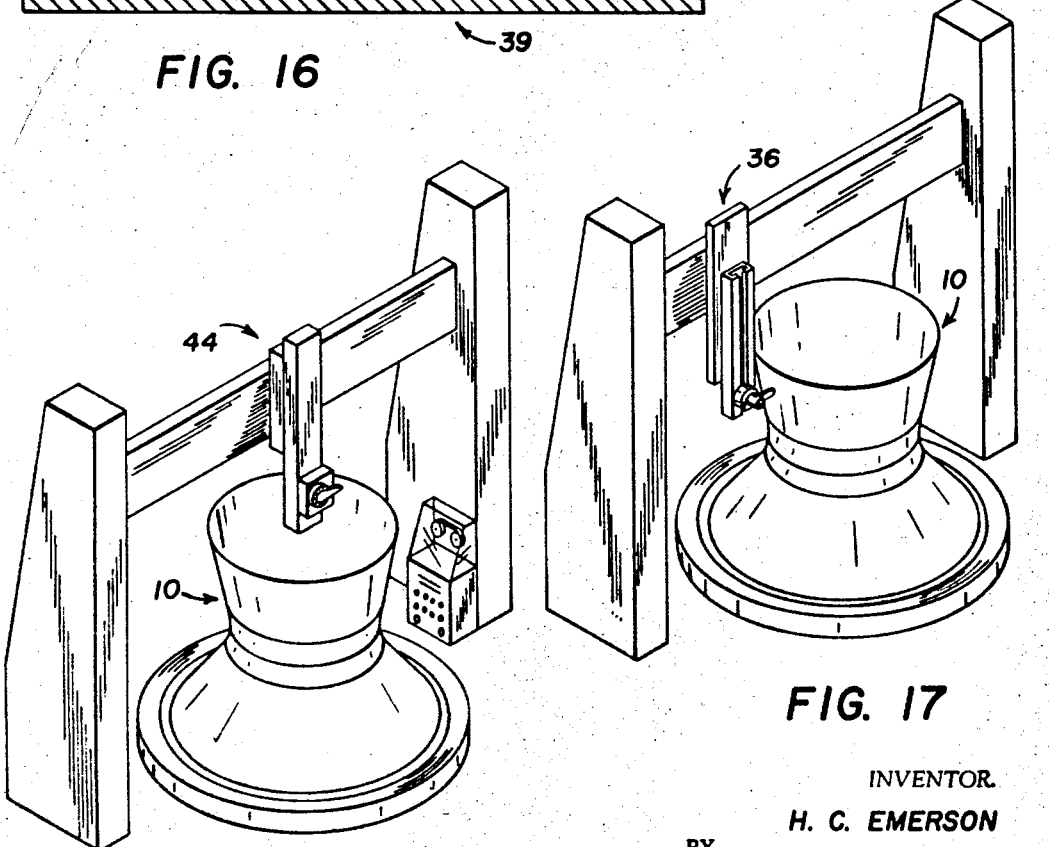
FIG. 17
FIG. 18
INVENTOR.
H. C. EMERSON
BY
George E. Pearson
ATTORNEY

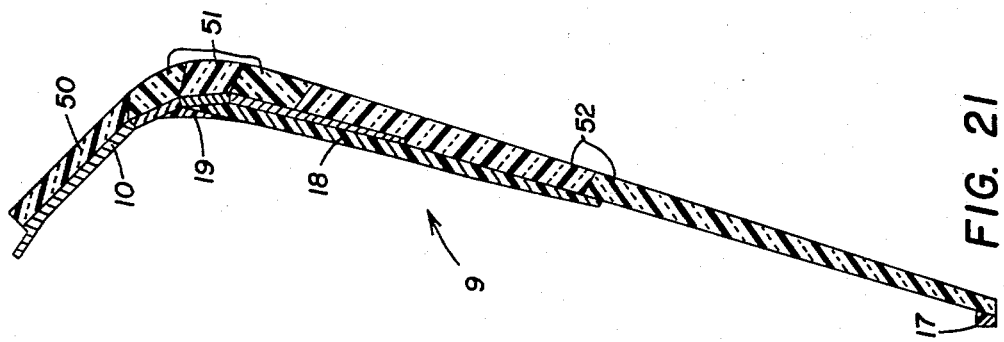
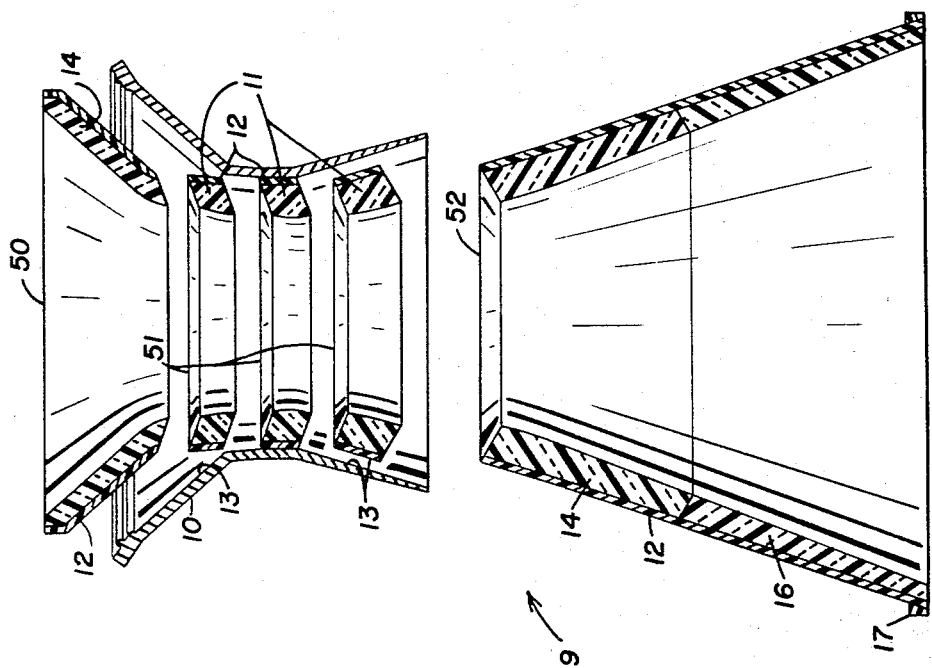
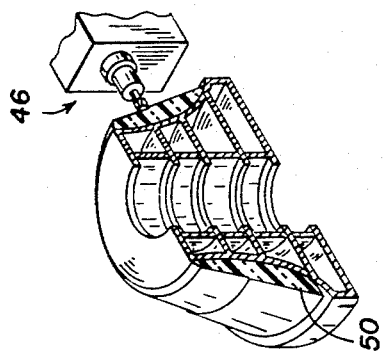

United States Patent Office 3,418,707
Patented Dec. 31, 1968

---

3,418,707
INTEGRATED AND MATCH MACHINED ROCKET NOZZLE AND PROCESS OF MAKING SAME
Herff C. Emerson, Chula Vista, Calif., assignor to Rohr Corporation, San Diego, Calif., a corporation of California
Filed Apr. 19, 1965, Ser. No. 449,076
4 Claims. (Cl. 29—157)

ABSTRACT OF THE DISCLOSURE

A rocket nozzle shell-ablative liner composite is disclosed in which a large hot sized, high strength unitary nozzle is formed of annularly welded frusto-conical ring sections of varying diameters and cone angles. Each of the ring sections is formed of arcuate ring segments welded together to form a unitary frusto-conical ring section, and each ring segment is cut and contoured plate metal. The welded ring sections and unitary nozzle are hot sized to remove distortion, and the external surfaces of the resulting nozzle structure is only nominally machined to design configuration. The internal surface dimensions of the nozzle are measured numerically to receive a match machined ablative liner which is bonded thereto. The liner has an inner layer of an ablative material and an outer layer of a resin impregnated fibre glass fabric which is machined to the inner dimensions of the nozzle shell.

Background

This invention relates to rocket nozzles in general and more specifically to a segmented rocket nozzle shell-ablative liner composite and the process of integrating the shell and match machining the liner thereto.

The rocket nozzle shell-ablative liner composite and the process considered herein allows for the fabrication of large rocket nozzle shell-ablative liner composites previously considered impractical, if not impossible, due to limitations imposed by size and economic factors. Certain of the prior art nozzle-ablative composites that heretofore have been fabricated incorporate a single forging for the shell. This prior art method is necessarily limited to nozzle-ablative composites of relatively small size. The use of a single forging, moreover, necessarily requires additional material to form the forging envelope that subsequently has to be machined off.

Other prior art nozzle shell-ablative liner composites of larger sizes also have heretofore required a forging or a combination of cone section forgings joined together by a welding process. In these larger nozzle shell-ablative composites a definite size limitation is placed on the forgings obtainable due to the limiting capabilities of present state-of-art forging techniques. Here again, as in the case of the smaller nozzle shell-ablative composites, excessive material is required for the forging envelope which is subsequently machined away.

Present invention

In accordance with the present invention, wherein plate segments are used, only a nominal excess of material for clean-up machining purposes of the integrated nozzle shell is required, thereby greatly reducing the costly prior art machining process necessarily incurred in the use of forgings. By using plate segments with only a nominal excess of material for the larger size nozzle shell-ablative composites, moreover, even greater savings are realized. The size of the cone sections of the larger nozzle shell-ablative composites according to the present method are thus not limited to the size of the forgings as in the prior art methods but only to the size of plate stock available.

By match machining the ablative material to mate with the internal surfaces of the nozzle shell as contemplated in the present invention, the handling and fit-up problems attendant with large size nozzle shells are greatly minimized. Using numerically controlled machining techniques to form the liner to the size and shape of the internal surface of the nozzle shell, the ablative material can be fitted and bonded to the nozzle shell without requiring an excessively thick adhesive line.

Objects

An object of the present invention is to provide a fabrication method for rocket nozzle shell-ablative liner composites of a variety of sizes and materials.

Another object is to fabricate nozzle shell-ablative composites previously limited in size by using integrated cone ring segments and sections that are joined by a welding process.

Another object is to eliminate the costly machining of excess forging material by using plate segments containing only a nominal amount of excess material.

Another object is to greatly reduce distortion introduced by the fabrication and welding processes by heat treating and sizing the individual segmented cone sections and the entire nozzle shell on specialized sizing fixtures.

Another object is to greatly reduce any distortion introduced by the fabrication and welding processes such that the internal surfaces of the nozzle shell will require no machining or only a minimum of machining in order to have an ablative liner attached thereto.

Still another object is to match machine the external surfaces of the ablative liner material to mate with the internal surfaces of nozzle shell thus eliminating the fit-up and handling problems associated with prior methods.

Yet another object is to use numerically controlled machining techniques to form the external surfaces of the ablative liner to the size and shape of the internal surfaces of the nozzle shell to thereby allow the ablative liner material to be fitted and bonded to the nozzle shell without requiring an excessively thick adhesive line.

A still further object is to use numerically controlled machining techniques to obtain maximum dimensional control of all detail parts and final assembly operations for all machining, grinding, tape wrapping and filament winding.

Still other objects, features and advantages of the present invention will become more clearly apparent as the description proceeds, reference being had, to the accompanying drawings wherein:

Brief description of the drawings

FIG. 1 is a perspective view of a completed rocket nozzle constructed in accordance with the present invention and attached to a rocket motor case;

FIG. 2 is an elevational view of a completed rocket nozzle detached from the rocket motor case;

FIG. 3 is a perspective view showing the layout of the plate segments;

FIG. 4 is a fragmentary view illustrating the cutting of a plate segment;

FIG. 12 is a persepctive view illustrating the machining operation of the weld preparation for the cone section circumferential welds;

FIG. 13 is a perspective view illustrating the manner in which the cone sections are positioned prior to welding;

FIG. 14 is a perspective view showing the circumferential welding operation;

FIG. 15 is a view of the hot sizing fixture used for sizing the entire nozzle shell;

FIG. 16 is a sectional view, somewhat enlarged, of the hot sizing fixture taken along the line 16—16 of FIG. 15;

FIG. 17 shows an arrangement for machining the external surfaces of the sized nozzle shell;

FIG. 18 is a perspective view showing an arrangement for reading and tape recording the shell dimensions to be used in the numerical control machining of the mating ablative liner components;

FIG. 19 is a perspective view, partially cut-away, illustrating the numerical control machining of the mating ablative liner components;

FIG. 20 is a composite sectional view showing the mating of the ablative liner components to the internal surface of the nozzle shell; and FIG. 21 is a composite sectional view showing the wall construction of a completed rocket nozzle and showing the various materials used in its construction.

Specification

Figure 6:
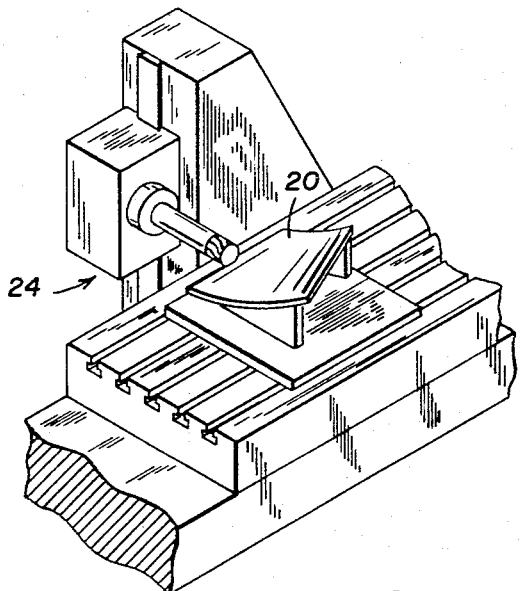
FIG. 6 is a perspective view showing the machining operation of the plate segment weld preparation.
Figure 8:
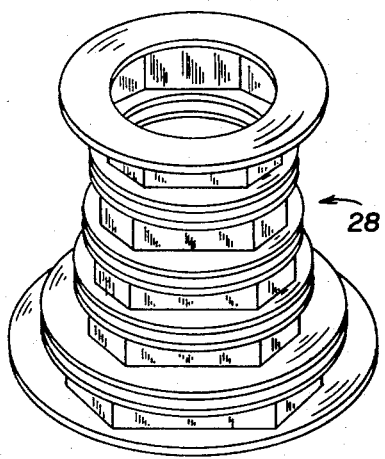
FIG. 8 is a perspective view of the O.D. weld jig sections employed, each section being used to position each individual cone section.

Reference is now directed to the drawings for a more complete understanding of the invention and first more particularly to FIG. 1 which depicts a fragmentary portion of a rocket of a type designed for space exploration. Such a rocket employs a motor case 8 to which is attached a nozzle 9. Such rockets, including the nose cone and intermediate sections may have overall dimensions of the order of 260 inches in diameter and 100 feet in length, and are capable of producing a thrust upwards of three million pounds.

The invention per se is directed to the nozzle 9 which is shown in detail in FIG. 20 to which attention is now directed. It will be seen that rocket nozzle 9 comprises a shell 10 of a varying converging and diverging configuration and ablative liner sections 50, 51, and 52 assembled and bonded thereto. The shell 10 being of a high strength material such as 18% nickel maraging steel, serves as the main structural element of the nozzle. Accordingly, the shell 10 acts to restrain the thrust force that the nozzle is subjected to as a result of the burning of the rocket fuel. The ablative liner material in sections 50, 51 and 52 serves to protect the shell 10 in a two-fold manner. First, the major portion of the exhaust gas heating from the burning of the rocket fuel is absorbed by the material which is ablated away, and, secondly, the material which does not ablate away insulates the shell 10 by absorbing any conducted heat.

Fiberglass material 12 is wrapped around the ablative material of sections 50, 51 and 52 to provide strength and additional insulation for the shell 10. A bonding material (not shown) is applied as at 13 between the surfaces of the ablative material sections and of the shell 10 and serves as the means of attaching the ablative sections to the shell.

Attention is now directed to FIGS. 3 and 4 for a detailed description of the process by which the rocket nozzle shell is fabricated. To obtain the plate segments 20, FIG. 4, that make up the cone sections of the shell, flat pattern templets 21 are laid out and scribed on flat plate stock 22 of the material used for the shell. Once the segments are scribed on the flat plate stock the flat pattern templets 21 are removed and the segments 20 are cut out of the plate, as shown in FIG. 4, by a suitable cutting process such as plasma arc cutting.

Figure 5:
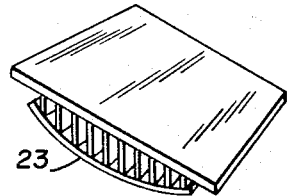
FIG. 5 is a view in perspective of the hot form die arrangement for contour forming the plate segments.
Figure 5:
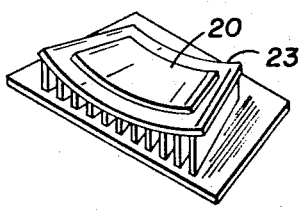

Once the flat plate segments 20 are cut from the flat plate stock 22 they are heated to an appropriate annealing temperature such as 1650° F. for 18% nickel maraging steel. While at the appropriate annealing temperature, each segment is hot formed to the required contour in the hydropress 23, FIG. 5. This contour forming operation can also be formed by cold working the flat plate segments 20 on a press.

When the contour forming operation is completed, each formed plate segment 20 is set up in a milling machine 24, FIG. 6, and a weld preparation is machined into it. In the instant case where the plate segments are of a substantial thickness, a weld preparation in the form of matched edge grooves referred to in the art as a U-joint, is employed to facilitate the welding process, it being understood where relatively thin plate segments are used a weld preparation may not be required. In still other instances a similar weld preparation on the opposite surfaces of the plate segments to be joined may be required.

Figure 7:
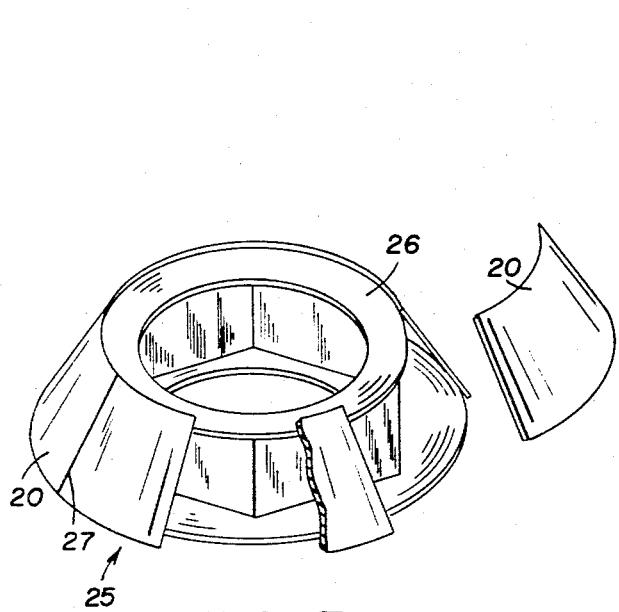
FIG. 7 is a perspective view illustrating the way in which the plate segments are fit together on a jig prior to welding.
Figure 9:
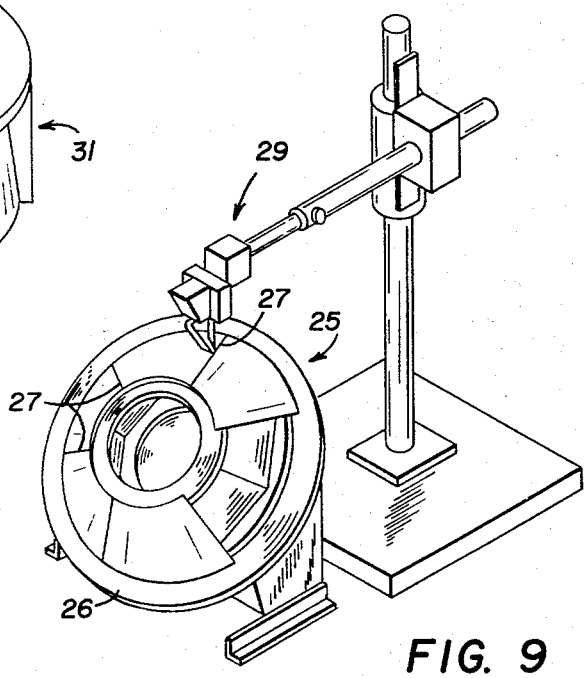
FIG. 9 is a perspective view illustrating the O.D. cone section welding operation using one of the O.D. weld jig sections shown in FIG. 8.
Figure 10:
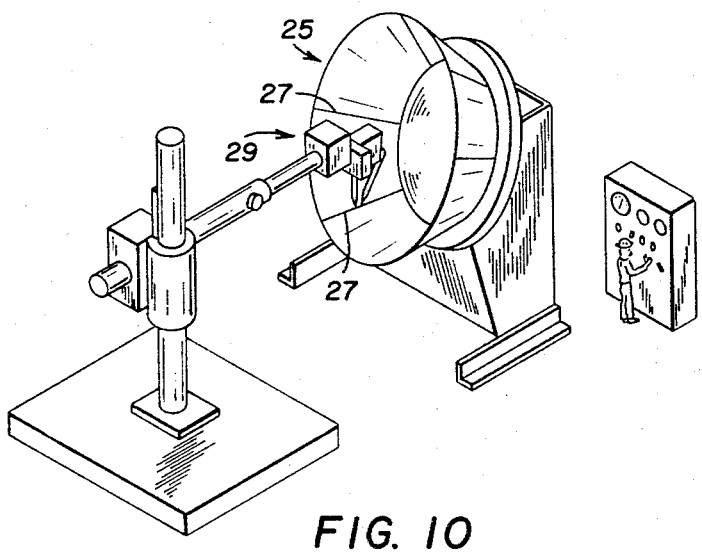
FIG. 10 is a perspective view illustrating the I.D. cone section welding operation.

In FIG. 7 the necessary number of plate segments 20 required to make up a cone section 25 are shown fit together on the weld jig 26, for tacking welding of the same together prior to making the longitudinal welds 27 of the cone section 25. The welding occurs as depicted in FIG. 9 which shows the making of an O.D. weld pass of a longitudinal weld 27 by an automatic welding machine 29 such as a Linde "Unionmelt" Welding Head. After all of the O.D. weld passes of the longitudinal welds 27 are completed, the cone section 25 is repositioned as shown in FIG. 10 and an I.D. weld pass of a longitudinal weld 27 is made thus completing the weld. The nature of large rocket nozzles is such that they require material gages which are too thick to permit single pass welding. In order to weld the various thick plate segments a 2 pass O.D. and I.D. welding technique has been found very successful.

Figure 11:
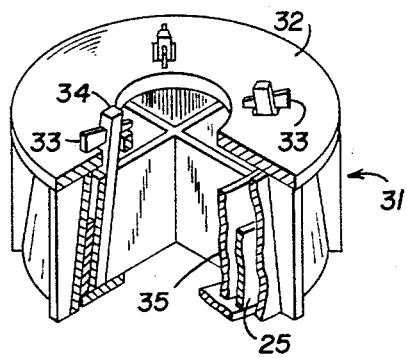
FIG. 11 is a perspective view, partially cut-away, of a hot sizing fixture used for sizing one of the individual cone sections.

FIG. 11 illustrates a typical hot sizing fixture 31 which is used to greatly reduce any distortion introduced by the welding process in any one of the cone sections. The cone section is heated to the annealing temperature of the material and then placed on the sizing fixture while at that temperature. A cover plate 32 is placed over the cone section and force is applied to the cone section by means of the wedges 33, each of which is driven through an opening in a positioner post 34 therefor. By forcing the cone section 25 down against the rigid cone member 35 of sizing fixture 31, the cone section will be rounded up to the diameter of the cone member and will be properly sized. Once the sizing operation is completed, the cone section 25 will be positioned as shown in FIG. 12 and will have a circumferential weld preparation machined into it by a boring mill 36.

FIG. 13 shows the manner in which the cone section 25 is fit together with another cone section 37, on the weld jig 28 for tack welding of the same together prior to making the O.D. pass circumferential welds 38 by an automatic welding machine 29 shown in FIG. 14, thereby joining cone section 25 to cone section 37. After all of the O.D. pass circumferential welds 38 are completed, the shell is repositioned much in the same manner as in FIG. 10, and the I.D. pass circumferential welds are made by the same automatic welding machine 29.

FIG. 16 illustrates the hot sizing fixture 39 used to reduce the distortion that has resulted from the circumferential welding process. After the welding operations are complete the shell 10 is heated to the appropriate annealing temperature and placed on the sizing fixture 39 as quickly as possible. The cover plate 40 is then placed over the shell 10 and force is applied to the shell 10 by means of wedges 4, each of which is driven through an opening in the positioner post 42 individual thereto.

The sizing plates 43 are adjusted in such a manner that the combination of the shrinkage of the shell 10 and the imposed restraint of the sizing fixture 39 will allow the shell to be properly rounded and sized for subsequent operations.

If a final heat treating operation, such as a 900° F. aging cycle for 18% nickel maraging steel, is required, it is performed after the hot sizing operation.

After the sizing or heat treating operation is completed the external surfaces of the shell 10 are machined on the boring mill 36, as shown in FIG. 17, to satisfy design requirements.

FIG. 18 shows the manner in which the internal surface dimensions of the shell 10 are tape recorded by the recording device 44 to provide a record for use in the numerically controlled machining of the mating ablative liner sections 50, 51 and 52. These dimensions can also be obtained by conventional manual inspection techniques and then transposed onto tape for the numerically controlled machining of the ablative liner sections. These internal surface dimensions of the shell can be obtained by either of the above methods immediately after the hot sizing operation or after any machining operation subsequent to the hot sizing operation.

FIG. 19 shows the numerically controlled machining of the mating ablative liner section 50 by a tape controlled machining head 46. This numerically controlled machining technique reproduces the size and shape of the internal surfaces of the shell 10 in FIG. 18 on the outside surfaces of the mating ablative liner component 45 in FIG. 19. By employing such a machining technique the mating and fit-up problems are minimized and the ablative liner sections 50, 51 and 52 can be fitted and attached without requiring an excessively thick adhesive line.

Referring to FIG. 20 it is seen that the shell ablative liner material 11, 14, 15 and 16 is fitted into and bonded to the shell 10 in various sections 50, 51 and 52. The ablative liner material 11 comprising the throat sections 51, is composed of wrapped graphite fabric tape, bias cut, and impregnated with a phenolic resin which is cured by a combination of pressure and temperature. After the curing cycle the ablative liner material 11 is machined and then wrapped with a bidirectional glass fabric 12 impregnated with a phenolic resin. This composite section 51 is then cured by a combination of pressure and temperature, machined as previously indicated by numerically controlled machining techniques and bonded to the shell 10. The ablative liner material 14 comprising the convergent or inlet cone section 50 is made up of a carbon fabric tape, bias cut and impregnated with a phenolic resin. This section 50 is also wrapped with the glass fabric 12 and is cured, machined and bonded to the shell 10 in the same manner as is section 51. The divergent or exit cone section 52 is constructed with two ablative liner materials 14 and 16. The ablative liner material 16 is made up of a high-silica fabric tape, warp cut and impregnated with a phenolic resin. This section 52 is wrapped with the same glass fabric 12 as sections 50 and 51 and is also cured, machined and bonded to the shell 10 in the same manner. A reinforcement and stiffening is provided for the end of the exit cone section 52 by the additional wrapping of high-strength glass rovings 17, which are impregnated with an epoxy resin and cured at room temperature.

The different ablative liner materials 11, 14 and 16 are used because of the variation in the design criteria encountered at different locations throughout a rocket nozzle. The point of major concern in the inlet cone section 50 design is to insulate the shell 10 from the erosive high temperature gas flow in this subsonic flow region. The uniformity of material is very important in this area because of the erratic downstream erosion which can be caused by turbulent flow resulting from excessive channeling or irregular erosion in the exit cone section 52. The ablative liner material 14 made up of carbon-reinforced bias-cut tape has the proper fiber orientation and density to withstand the high temperature gas flow while insulating the shell 10. This ablative liner material 14 is also capable of predictable erosion characteristics which are also necessary in the design of the inlet cone section 50.

The throat sections 51 are also composed of bias-cut tape but with a graphite reinforcement. The major concern with the ablative liner material 11 in the throat sections 51 is resistance to thermal shock and attendant damage due to cracks and excessive channeling. The use of tape-wrapped graphite throat sections 51 minimizes this problem by providing a more elastic material, better able to withstand the thermal shock and possessing greater structural integrity due to the circumferential continuity of the graphite reinforcement fibers.

The ablative liner material 14 used in the forward portion of the exit cone section 52 consists of carbon-reinforced tape because of the high temperatures and severe erosion conditions encountered just aft of the throat section 51 and because of the necessity for providing good downstream support to the throat section 51. In the aft portion of this exit cone section 52, the ablative material 16 utilized is a less expensive silica-reinforced tape having a slightly higher erosion rate than the carbon but adequate for the less severe conditions encountered in this area.

Attention is now directed to FIG. 21 which shows the completed rocket nozzle 9. After all the ablative liner sections 50, 51 and 52 have been bonded to the shell 10 and cured, structural tie laminate, bidirectional glass fabric tape 18, warp cut, and wet-dip coated with a phenolic resin is wrapped around the outside of the shell 10 from the forward end of the middle throat section 51 to just beyond the forward portion of the exit cone section 52. This structural tie laminate tape 18 provides greater support for the shell 10 and the exit cone section 52 and allows the exit cone section 52 to withstand the resulting operational thrust forces. Glass roving 19, wet-dip coated with an epoxy resin is then wrapped around the outside of the shell 10 at the aft two throat sections 51. This glass roving 19 is added to provide reinforcement of the shell required due to an increased pressure build-up at this area during nozzle operation. Both the structural tie laminate tape 18 and the glass roving 19 are cured at room temperature.

From the foregoing it will now be apparent that a novel and unique rocket nozzle construction and process of manufacture thereof which are well adapted to fulfill the aforestated objects of the invention. While various alternative embodiments and methods which fall within the scope of the present invention may suggest themselves of those skilled in the art, it is intended in the appended claims to cover all such additional embodiments, constructions and methods which fall within the spirit and scope of the invention.

Having thus described the invention, what is claimed as new and useful and what is desired to be secured by Letters Patent is:

1. A process for manufacturing an integrated rocket nozzle shell comprising the steps of cutting flat plate into a plurality of plate segments, contour forming said plate segments into arcuate frusto-conical ring segments, welding said segments into a plurality of discrete frusto-conical ring sections of varying diameters and cone angles, hot sizing said ring sections to remove distortion, welding the ring sections together to form a unitary shell structure, hot sizing the unitary shell structure to remove distortion, and machining the external surfaces of the shell structure.

2. A process for manufacturing an integrated rocket nozzle shell as in claim 1, said hot sizing of the ring section and shell parts comprising the steps of heating the part to the annealing temperature of the material, placing the heated part over a rigid fixture having a surface conforming to the desired dimensions of the part, and imparting a force to the part to drive said part against said rigid sizing fixture thereby conforming to the size and shape of the said part to that of the fixture.

3. A process for manufacturing a rocket nozzle-ablative liner composite comprising the steps of measuring and recording the dimensions of the internal surfaces of a nozzle shell made in the process of claim 1, match machining the external surface dimensions of the ablative liner sections to correspond with the internal surfaces of the nozzle shell, and interfitting and attaching the match machined ablative liner sections to the nozzle shell.

4. A process of match machining, interfitting and attaching ablative liner sections to a nozzle shell made in the process of claim 1 comprising the steps of measuring and recording by numerical control the internal surface dimensions of the nozzle shell, machining the external surfaces of the mating ablative liner sections by numerical control using said recorded dimensions, and interfitting and attaching said liner sections to the nozzle shell.

References Cited

UNITED STATES PATENTS

| | | | |
|---|---|---|---|
| 1,621,007 | 3/1927 | Ford | 29—471.1 |
| 2,337,049 | 12/1943 | Jackson | 29—475 |
| 2,700,988 | 2/1955 | Smisko | 29—463 |
| 2,732,323 | 1/1956 | Linnert | 29—487 X |
| 2,948,061 | 8/1960 | Carstens | 29—463 |
| 3,052,021 | 9/1962 | Needham | 29—493 X |
| 3,082,601 | 3/1963 | Witt. | |
| 3,184,362 | 5/1965 | Litsky et al. | 29—493 X |
| 3,186,063 | 6/1965 | Dopp | 29—475 X |

CHARLIE T. MOON, *Primary Examiner.*

PAUL M. COHEN, *Assistant Examiner.*

U.S. Cl. X.R.

29—407, 463, 471.1, 475, 487, 493, 497